E. G. WATROUS.
LAVATORY FIXTURE.
APPLICATION FILED AUG. 17, 1910.
1,082,250.
Patented Dec. 23, 1913.
2 SHEETS—SHEET 1.
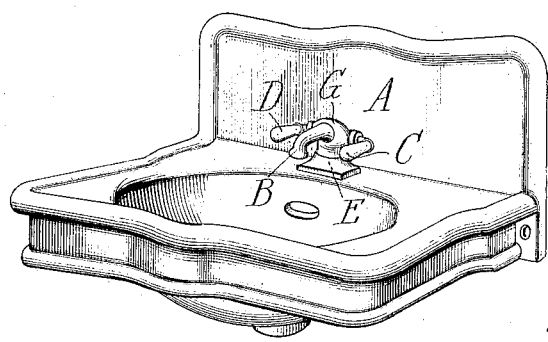
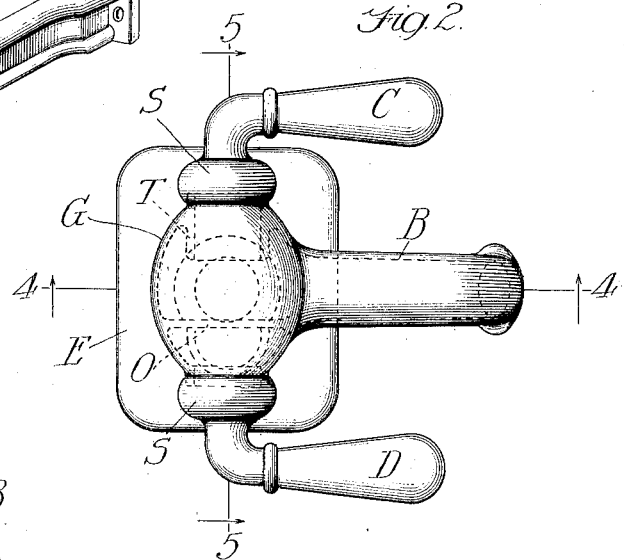
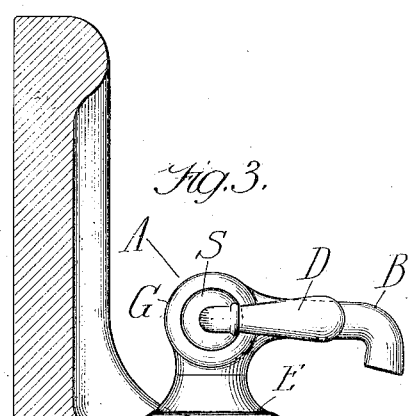
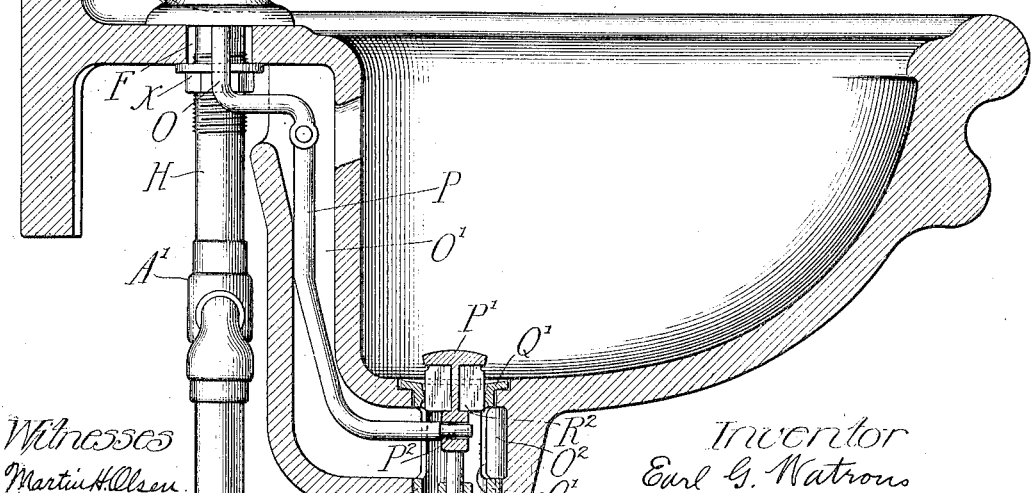
Witnesses
Martin H. Olsen
Robert Dobberman
Inventor
Earl G. Watrous
By Rector, Hibben, Davis & Macauley
His Attys

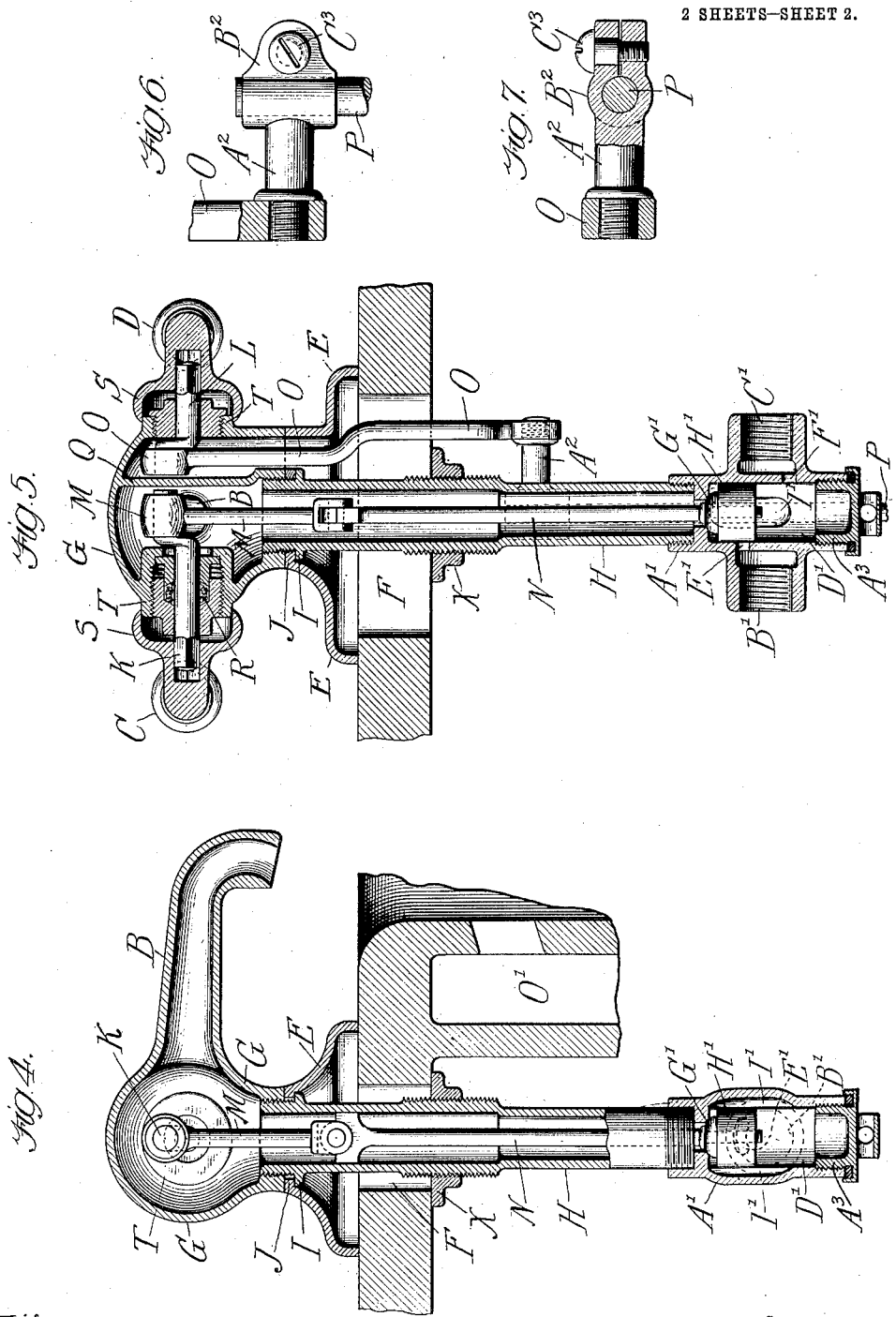

UNITED STATES PATENT OFFICE.

EARL G. WATROUS, OF CHICAGO, ILLINOIS.

LAVATORY-FIXTURE.

1,082,250.

Specification of Letters Patent.   Patented Dec. 23, 1913.

Application filed August 17, 1910.   Serial No. 577,696.

*To all whom it may concern:*

Be it known that I, EARL G. WATROUS, a citizen of the United States, residing at Chicago, in the county of Cook and State of Illinois, have invented certain new and useful Improvements in Lavatory-Fixtures, of which the following is a description, reference being had to the accompanying drawings, forming part of this specification.

My invention has for its object the combining, in a single compact and sightly fixture, of the devices for controlling the flow of water to the bowl or basin and the devices for controlling its escape therefrom, said devices being operated by independent handles located on opposite sides of the fixture.

It has for a further object the provision of improved means for controlling the relative supply of hot and cold water to the bowl; all as hereinafter more fully set forth and particularly pointed out in my claims.

In the accompanying drawings, Figure 1 is a perspective view of a lavatory equipped with my improved fixture; Fig. 2 a top plan view of said fixture; Fig. 3 a vertical section of the bowl in a plane at the left of the fixture and showing the latter and the waste-plug and its lifting devices in elevation; Fig. 4, a middle vertical section through the fixture, approximately on the line 4—4 of Fig. 2, and showing part of the bowl in section; Fig. 5 a corresponding transverse section, approximately on the line 5—5 of Fig. 2; and Figs. 6 and 7 detail views of some of the connecting parts for lifting the waste-plug.

The same letters of reference are used to indicate corresponding parts in the several views.

As shown in Figs. 1 and 2, my novel fixture A is secured to the bowl structure immediately in rear of the middle of the bowl, and is provided at its middle with a forwardly projecting and downwardly curved discharge spout B, and at its opposite sides with two forwardly projecting handles C D, the former of which in the present instance controls the water supply and the latter the discharge or waste.

The body of the fixture comprises in the present instance a hollow base casting E secured (in the manner hereinafter described) upon the horizontal top of the bowl structure, over a suitable opening F therein, Figs. 4 and 5, and a superimposed casing G secured to the base casting E by means of the threaded upper end of the water supply pipe H which engages internal threads formed in the bottom of the casing G and is provided with a circumferential flange or collar I which engages an inturned flange formed around the opening in the upper end of the casting E, the threaded upper end of the pipe H and its collar I thus serving to clamp the casing G securely to the casting E. A nut X screwed upon a threaded portion of the pipe H immediately below the horizontal shelf of the bowl structure and bearing against the latter, serves to clamp the fixture to the bowl. The parts E and G of the casing may be formed of one integral casting, if desired, I having shown it in two parts merely to enable me to use parts E of different shapes, as oval or rectangular, with the same part G.

Journaled in suitable bearings provided for them in the opposite sides of the casing G, Fig. 5, are two crank-arms or eccentrics K, L, upon the outer ends of which are secured the respective operating handles C D. The inner end of the crank K has connected to it the upper end of a link or pitman M whose lower end is connected to the upper end of a rod N which extends downward through the water supply pipe H and operates the valve, at the lower end of the latter, which controls the water supply; while the inner end of the crank L has connected to it the upper end of an arm or link O whose lower end is connected to an arm P, Fig. 3, which extends downward through the overflow passage formed in the rear side of the bowl structure, and has its lower forwardly projecting end connected to the waste-plug. The interior of the casing G is provided with a vertical partition Q, Fig. 5, which separates it into two compartments, in one of which is located the inner end of the crank K and upper end of the pitman M, and in the other of which is located the inner end of the crank L and upper end of the link O. The upper end of the water supply pipe H opens into the former compartment, and the discharge spout B of the fixture leads forward from it, and the bearing for the crank K in the side of the casing is provided with a suitable stuffing box R to prevent leakage of the water. The handles C and D fit over the square or polygonal outer ends of the cranks K and L, respectively, and each is provided with a cup-shaped flange S, which cups or flanges fit snugly around circular bosses T upon the opposite sides of the casing G, to give the fixture a smooth and symmetrical finish, without exposed joints.

The valve for controlling the admission of water to the lower end of the water supply pipe H may be of any suitable construction, and may be a valve for controlling a single supply of either hot or cold water, or a valve of any suitable construction for controlling and regulating the relative supply of both hot and cold water; but in the present instance one of the features of my invention consists in the provision of a valve of novel construction operated by the single handle C for controlling and regulating the relative supply of both hot and cold water. This valve is best shown in Figs. 4 and 5, where it will be seen to comprise a casing A' whose upper end is coupled or otherwise secured to the lower end of the water pipe H, and whose lower end is closed by a screw plug A³, and which is provided with two laterally projecting pipe-connections B' C', the former for hot water and the latter for cold. This casing A' is provided with a central cylindrical chamber D' which communicates by a port E' with the hot water connection B', and by a port F' with the cold water connection C', said ports being located in different planes as shown. The valve chamber D' contains the valve which controls the passing of the water from the upper end of said chamber to the supply pipe H leading to the fixture upon the bowl structure above. This valve is secured upon the lower end of the valve stem or operating rod N and consists of a "Fuller ball" G' which coöperates with the valve seat at the upper end of the chamber, and a cylindrical body portion H' which fits snugly within the chamber D' and controls the ports E' and F' in the manner hereafter described. The chamber D' is provided in one or more of its sides with a groove or recess I', which extends from the upper end of the chamber, adjacent the valve-seat, downward to the horizontal plane of the port F', and forms a by-pass around the cylindrical body H' of the valve whenever the latter is unseated by depressing the valve stem N. In the position of the parts shown in Fig. 5, with the valve closed, cold water is being admitted to the lower portion of the chamber D' through the port F' and fills such portion of the chamber and the by-pass I', but cannot escape from the upper end of the chamber because of the seating of the valve. Immediately upon the unseating of the valve, however, the water is free to flow upward around the valve, through the passage or passages I', into and through the supply pipe H, and this will continue until the valve is depressed far enough for its cylindrical body portion H' to move over and close the cold water inlet port F', whereupon the supply of cold water will be cut off. As the lower edge of the part H' of the valve reaches the upper edge of the port F' and begins to close the latter, in the downward movement of the valve, the upper edge of such part of the valve will pass below and begin to uncover the port E' communicating with the hot water inlet B', with the result that from that time forward until the cold water inlet port F' is entirely closed both hot and cold water will be admitted to the pipe leading to the fixture and bowl, in proportions determined by the relative opening of the ports E' and F'. Upon the full depression of the valve stem and valve, and entire closure of the cold water inlet port F', the hot water inlet port E' will be opened to its full extent, and hot water only be therefore supplied to the fixture and bowl.

The waste-plug, and the connections with the handle D for operating it, are best shown in Figs. 3 and 5, where it will be seen that the arm or link O whose upper end is hung upon the crank L extends downward through the opening in the horizontal portion of the bowl structure, and thence forward through an opening in the rear side of the bowl structure, into the upper end of the overflow passage O' formed in the rear side of said structure and communicating at its lower end with the waste pipe at the bottom of the bowl. Located in this passage O' is a long lifting arm P whose upper end is connected to the bent arm or link O in the manner hereafter described, and whose lower end extends forward beneath the waste-opening in the bottom of the bowl and is suitably connected with the waste-plug or valve P'. This plug or valve, when lowered, fits in a seat formed for it in the flanged upper end of a tubular cage or casing Q' which extends downward through the bottom of the bowl structure and is clamped to the latter by a flanged nut R', the flange surrounding the upper end of said cage or casing fitting in an annular recess formed for it in the bottom of the bowl around the waste opening therein. The vertical overflow passage O' communicates at its lower forwardly extending end with an annular chamber or recess O² formed in the bottom of the bowl structure around the casing or cage Q', and the latter is provided with a plurality of vertical openings Q² coincident with said chamber, through one of which openings the lower and forwardly projecting end of the lifting arm P passes. In the present instance the extremity of this arm is rounded and passes loosely through an eye P² formed for it in the depending stem P³ of the valve or plug P'. This stem passes through a suitable guideway Q³ formed for it within the casing Q' and is connected with the plug or valve P' by a plurality of vertical guides or wings R² which loosely fit within the upper portion of the tubular casing Q' and further serve to guide the parts in their vertical movements. Under this construction and arrangement of the parts the lifting of the arm P by manipulation of the handle D serves to lift the plug or valve P' and open the waste-discharge from the bowl; while the lowering of the arm P serves to close it. The crank L, by which the arm P is raised and lowered, may of course be so arranged relative to its operating handle D that the lifting arm P the waste plug P' may be in either raised or lowered position when the handle is in normal position; but inasmuch as it is frequently desired to use a lavatory with a supply of running water, with the waste left open, I prefer to so arrange the parts relatively to each other that the waste is open when the handle D is in its normal horizontal position. If it be desired to fill the bowl with water the handle will be thrown upward and rearward to close the waste; but if it be desired to use the bowl without closing the waste the handle D will be left in its horizontal position, while the handle C will be swung upward and rearward, to a greater or less degree, to supply either cold water, or mingled cold and hot water, or hot water alone, as may be desired.

The connection of the lower forward end of the arm or link O with the upper end of the lifting arm P, Fig. 3, is shown in detail in Figs. 6 and 7, where it will be seen that the end of the arm O has screwed into it the shouldered end of an arm A² which extends to the right of the arm O and is provided with an enlarged and split end B² provided with a vertical passage for the reception of the rounded upper end of the arm P, which extends through said passage and is clamped therein by a screw C³ passed through the split end B² of the arm A². The arm A² is not so tightly screwed into the arm O that it cannot turn therein, but on the contrary is left sufficiently loose to accommodate the necessary relative movements of the arms O and P in the lifting of the latter.

A subordinate feature of my invention consists in reversely curving the extremity of the discharge passage through the spout B, as shown in Fig. 4, in such manner as to direct the issuing stream of water slightly rearward of a vertical line, so as to cause it to strike the rear wall of the bowl, at a slight angle thereto, and thereby avoid the spattering ordinarily resulting from the discharge of the water in a vertical stream directly against the bottom of the bowl.

Having thus fully described my invention, I claim:

1. A lavatory fixture, comprising a casing having a delivery spout and provided upon its opposite sides with projecting circular bosses, a pair of cranks or eccentrics journaled in the opposite sides of the casing centrally of said bosses, operating handles applied to the outer ends of said cranks and provided with cup-shaped hubs encircling and fitting said bosses, and connections between the inner ends of the cranks, within the casing, and the valves which control the water supply and the waste, respectively; substantially as described.

2. A lavatory fixture, comprising a casing provided upon its opposite sides with projecting circular bosses and having its interior separated by a partition into two chambers, with one of which the water supply pipe is adapted to be connected and from which the delivery spout leads, a pair of cranks journaled in the opposite sides of the casing centrally of said circular bosses, connections with said cranks, within the respective chambers, for operating the valves for controlling the water supply and the waste, and handles applied to the outer ends of said cranks and provided with cup-shaped hubs encircling and fitting the circular bosses upon the opposite sides of the casing; substantially as described.

3. A lavatory fixture, comprising the hollow casing E G having the delivery spout B and internal partition Q and provided upon its opposite sides with the projecting circular bosses T T, the cranks K L journaled in bearings in the opposite sides of the casing centrally of said bosses, the operating handles C D applied to the outer ends of said cranks and provided with the cup-shaped hubs S S surrounding and fitting said bosses, and the links N and O hung upon the inner ends of the cranks, within the casing, and connected with the valves for controlling the water supply and waste respectively; substantially as described.

4. The combination, with a lavatory having a horizontal top or shelf portion in rear of the bowl and provided with an overflow opening and passage at the rear side of the bowl, of a hollow casing secured upon such horizontal shelf portion and provided with a delivery spout projecting forwardly over the bowl, a pair of cranks or eccentrics journaled in bearings in the opposite sides of said casing, operating handles applied to the outer ends of said cranks, a water supply pipe communicating at its upper end with the interior of the casing and through the same with the delivery spout, a valve casing at the lower end of said pipe, a valve in said casing for controlling the supply of water, a waste plug or valve in the bottom of the lavatory bowl, a link hung upon the inner end of one of the cranks within the casing and connected through the water pipe with the valve for controlling the water supply, and a second link hung upon the other crank within the casing and connected through the overflow passage at the rear side of the bowl with the waste plug or valve in the bottom of the latter; substantially as described.

5. The combination, with a lavatory having an overflow opening and passage at the rear side of the bowl and provided with a horizontal top or shelf portion in rear of the bowl, of a casing secured upon such shelf portion over an opening therein and containing a water chamber and provided with a delivery spout communicating with said water chamber and projecting forwardly over the bowl, a pair of cranks or eccentrics journaled in bearings in the opposite sides of the casing, operating handles applied to the outer ends of said cranks, a water supply pipe extending through the opening in the lavatory shelf and communicating at its upper end with the water chamber of the casing, a valve casing at the lower end of said water pipe, a valve in said casing for controlling the water admitted through said casing to the pipe leading to the water chamber of the fixture above, a waste valve or plug in the bottom of the lavatory bowl for controlling the escape of water therefrom, a link hung upon one of the cranks in the water chamber of the casing and connected through the water pipe with the valve controlling the hot and cold water supply, and a second link hung upon the inner end of the other crank within the casing and connected through the overflow passage of the lavatory with the waste valve or plug in the bottom of the bowl; substantially as described.

6. The combination, with a lavatory having a horizontal top or shelf portion in the rear of the bowl, and provided with an overflow opening and passage in the rear side of the bowl, of a casing resting upon the horizontal shelf portion over a suitable opening therein, and provided with a water chamber and a delivery spout communicating therewith and projecting forwardly over the bowl, a water supply pipe extending vertically through the opening in the horizontal shelf portion of the lavatory and secured at its upper end in the casing, in communication with the water chamber therein, a nut screwed upon an externally threaded portion of said pipe beneath the horizontal shelf of the lavatory and serving to clamp the casing to the top thereof, a valve casing at the lower end of said water pipe, a valve in said casing, a waste valve or plug in the bottom of the lavatory bowl, a pair of cranks journaled in bearings in the opposite sides of the casing upon the top of the lavatory shelf, operating handles applied to the outer ends of said cranks, and links hung upon the inner ends of said cranks, within the casing, and connected through the water pipe and the overflow passage of the lavatory bowl, respectively, with the valves for controlling the water supply and the waste; substantially as described.

7. The combination, with the lavatory provided with the horizontal top or shelf portion in rear of the bowl and having the overflow opening and passage O' at the rear side of the bowl, of the casing E G secured upon the horizontal shelf of the lavatory, over the opening F therein, and containing the partition Q and provided with the delivery spout B, the cranks K L journaled in bearings in the opposite sides of the casing, the operating handles C D applied to the outer ends of said cranks, the water pipe H secured at its upper end in the casing E G and communicating therethrough with the delivery spout B, the valve casing at the lower end of the pipe H, a valve in the casing, the valve G' H' located in said chamber and coöperating with the outlet at its upper end and with the inlet ports E' F', the waste valve or plug P' located in the bottom of the lavatory bowl and controlling the escape of water therefrom, the link M hung upon the inner end of the crank K and connected by the rod or valve stem N, extending through the water pipe H, with the valve G' H', and the link O hung upon the inner end of the crank L and connected by the arm P, extending through the overflow passage O' of the lavatory bowl, with the waste valve or plug P'; substantially as described.

EARL G. WATROUS.

Witnesses:
LOUIS B. ERWIN,
ROBERT DOBBERMAN.

Correction in Letters Patent No. 1,082,250.

It is hereby certified that in Letters Patent No. 1,082,250, granted December 23, 1913, upon the application of Earl G. Watrous, of Chicago, Illinois, for an improvement in "Lavatory-Fixtures," an error appears in the printed specification requiring correction as follows: Page 4, lines 92-94, strike out the words "the valve G'H' located in said chamber and coöperating with the outlet at its upper end and with the inlet ports E'F',"; and that the proper corrections have been made in the files and records of this office and are hereby made in said Letters Patent.

Signed and sealed this 27th day of January, A. D., 1914.

[SEAL.]
J. T. NEWTON,
*Acting Commissioner of Patents.*